United States Patent
Yamamoto

(10) Patent No.: US 9,955,029 B2
(45) Date of Patent: *Apr. 24, 2018

(54) IMAGE OUTPUT SYSTEM HAVING A CUSTOMIZED USER INTERFACE

(71) Applicant: Sharp Kabushiki Kaisha, Osaka (JP)

(72) Inventor: Norihiro Yamamoto, Hyogo (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/972,899

(22) Filed: Dec. 17, 2015

(65) Prior Publication Data

US 2016/0105578 A1 Apr. 14, 2016

Related U.S. Application Data

(63) Continuation of application No. 14/713,281, filed on May 15, 2015, now Pat. No. 9,247,084, which is a
(Continued)

(30) Foreign Application Priority Data

Apr. 13, 2011 (JP) ................................. 2011-088954

(51) Int. Cl.
- *G06F 3/12* (2006.01)
- *H04N 1/00* (2006.01)
- *H04N 1/44* (2006.01)

(52) U.S. Cl.
CPC ....... *H04N 1/00514* (2013.01); *G06F 3/1253* (2013.01); *G06F 3/1285* (2013.01);
(Continued)

(58) Field of Classification Search
CPC .. G06F 3/1253; G06F 3/1285; G06F 3/12851; H04N 2201/0039;
(Continued)

(56) References Cited

U.S. PATENT DOCUMENTS

| | | |
|---|---|---|
| 6,633,915 B1 | 10/2003 | Hashimoto |
| 7,634,801 B2 | 12/2009 | Kizawa |

(Continued)

FOREIGN PATENT DOCUMENTS

| | | |
|---|---|---|
| JP | 2000-242658 | 9/2000 |
| JP | 2002-108741 | 4/2002 |

(Continued)

OTHER PUBLICATIONS

Co-pending U.S. Appl. No. 14/713,281, filed May 15, 2015 (application with allowed claims provided).

(Continued)

*Primary Examiner* — Gabriel Garcia
(74) *Attorney, Agent, or Firm* — Renner, Otto, Boisselle & Sklar, LLP

(57) ABSTRACT

An authentication processing portion of an MFP requests user authentication to a server based on user information including at least a user ID input from a mobile terminal apparatus or an operation panel. The server has a user authentication portion which performs the user authentication and a UI instruction portion which specifies, when the user authentication succeeds, a UI image displayed on a display panel of the apparatus for operating the MFP depending on the user ID, and instructs the MFP to display the UI image on the apparatus. The MFP executes image output in accordance with a user operation received from the apparatus through the wireless communication portion in a state where the UI image is displayed on the apparatus.

8 Claims, 6 Drawing Sheets

Related U.S. Application Data continuation of application No. 14/263,316, filed on Apr. 28, 2014, now Pat. No. 9,063,684, which is a continuation of application No. 13/441,193, filed on Apr. 6, 2012, now Pat. No. 8,724,136.

(52) U.S. Cl.
CPC ..... *H04N 1/00244* (2013.01); *H04N 1/00307* (2013.01); *H04N 1/00347* (2013.01); *H04N 1/00424* (2013.01); *H04N 1/00474* (2013.01); *H04N 1/00482* (2013.01); *H04N 1/00493* (2013.01); *H04N 1/00506* (2013.01); *H04N 1/00517* (2013.01); *H04N 1/00973* (2013.01); *H04N 1/4413* (2013.01); *H04N 1/4426* (2013.01); *H04N 1/4433* (2013.01); *H04N 2201/0039* (2013.01); *H04N 2201/0075* (2013.01); *H04N 2201/0094* (2013.01); *H04N 2201/0096* (2013.01)

(58) Field of Classification Search
CPC ... H04N 2201/0075; H04N 2201/0094; H04N 2201/0096
USPC ........ 358/1, 1.13, 1.15, 1.16, 402, 500, 474; 709/201, 203; 707/727, 706; 705/52, 705/330
See application file for complete search history.

(56) References Cited

U.S. PATENT DOCUMENTS

| | | | |
|---|---|---|---|
| 8,120,804 B2 | 2/2012 | Isobe et al. | |
| 8,134,734 B2 | 3/2012 | Greene | |
| 8,397,277 B2 | 3/2013 | Tsujimoto | |
| 8,422,039 B2 | 4/2013 | Kimura | |
| 8,527,886 B2 | 9/2013 | Morkawa | |
| 8,640,049 B2 | 1/2014 | Chung et al. | |
| 8,724,136 B2 | 5/2014 | Yamamoto | |
| 8,797,573 B2 | 8/2014 | Kamei et al. | |
| 9,063,684 B2 | 6/2015 | Yamamoto | |
| 9,247,084 B2* | 1/2016 | Yamamoto | H04N 1/00244 |
| 2005/0152544 A1 | 7/2005 | Kizawa | |
| 2007/0198845 A1 | 8/2007 | Morikawa | |
| 2007/0242301 A1 | 10/2007 | Tsuchie et al. | |
| 2008/0068647 A1 | 3/2008 | Isobe et al. | |
| 2008/0072301 A1 | 3/2008 | Chia et al. | |
| 2009/0073485 A1 | 3/2009 | Oka et al. | |
| 2009/0128844 A1 | 5/2009 | Kondo et al. | |
| 2009/0296140 A1 | 12/2009 | Sugiyama et al. | |
| 2010/0202016 A1 | 8/2010 | Matsuzawa | |
| 2011/0191440 A1 | 8/2011 | Morikawa | |

FOREIGN PATENT DOCUMENTS

| | | |
|---|---|---|
| JP | 2002-203168 | 7/2002 |
| JP | 2002-366248 | 12/2002 |
| JP | 2004-282673 | 10/2004 |
| JP | 2005-057549 | 3/2005 |
| JP | 2006-67408 | 3/2006 |
| JP | 2006-157565 | 6/2006 |
| JP | 2007-251919 | 9/2007 |
| JP | 2007-274209 | 10/2007 |
| JP | 2008-506139 | 2/2008 |
| JP | 2008-092077 A | 4/2008 |
| JP | 2008-104143 A | 5/2008 |
| JP | 2008-306653 | 12/2008 |
| JP | 2009-071819 | 4/2009 |
| JP | 2009-123009 | 6/2009 |
| JP | 2009-245095 | 10/2009 |
| JP | 2010-5877 | 1/2010 |
| JP | 2011-14996 | 1/2011 |
| WO | WO 2006/006704 | 1/2006 |

OTHER PUBLICATIONS

U.S. Office Action dated Oct. 10, 2013 for U.S. Appl. No. 13/441,193, now U.S. Patent No. 8,724,136 dated May 13, 2014.
U.S. Office Action dated Nov. 12, 2014 for U.S. Appl. No. 14/263,316.

* cited by examiner

IMAGE OUTPUT SYSTEM HAVING A CUSTOMIZED USER INTERFACE

CROSS-NOTING PARAGRAPH

This non-provisional application is a continuation of U.S. patent application Ser. No. 14/713,281 filed on May 15, 2015 (now U.S. Pat. No. 9,247,084), which is a continuation of U.S. patent application Ser. No. 14/263,316 filed on Apr. 28, 2014 (now U.S. Pat. No. 9,063,684), which is a continuation of U.S. patent application Ser. No. 13/441,193 filed on Apr. 6, 2012 (now U.S. Pat. No. 8,724,136), which claims priority under 35 U.S.C. § 119(a) on Patent Application No. 2011-088954 filed in JAPAN on Apr. 13, 2011, the entire contents of which all are hereby incorporated herein by reference.

FIELD OF THE INVENTION

The present invention relates to an image output system in which a multi-functional peripheral and a server are connected through a network.

BACKGROUND OF THE INVENTION

Recently, in a convenience store (hereinafter, referred to as a "CVS"), a multi-functional peripheral connected to a network is used in various situations such as issuing of an event ticket reserved in advance, issuing of a coupon ticket, and purchase of an item also allowing electronic transactions. On the other hand, the distribution amount of mobile terminal apparatuses equipped with a local interface or an interface of a wired or wireless LAN (Local Area Network) increases in recent years. Examples of such a mobile terminal apparatus include a mobile phone (which also includes one called smart phone), a mobile information terminal (PDA), a mobile PC (personal computer) and the like. Moreover, also in such a use case that the multi-functional peripheral as described above is connected from the user side, cases of using such a mobile terminal apparatus have been on the increase.

In addition, the development has been made in each company not only to provide a quick service for customers by cooperating with a network-compliant device in cloud computing (hereinafter, referred to simply as a "cloud") but to improve the function of an appliance by cooperating with a serviceman who does maintenance or cooperating with totaling processing of various information.

An end user makes a reservation or registration for a necessary function from a network-compliance device such as a mobile terminal apparatus in advance and enjoys the function such as acquisition or purchase of information, a ticket and the like in accordance with the prescribed procedure in the CVS. In addition, not only in the CVS, but also in stalls of companies or public institutions such as universities similarly, cases where a short-distance wireless apparatus such as an IC (Integrated Circuit) card used as a student identification card or an employee identification card is used as a trigger of acquisition or purchase of information, a ticket and the like registered in advance have been on the increase.

In the cloud, identification information for identifying a user is used for extracting various types of information (for example, see Japanese Laid-Open Patent Publication No. 2002-108741, National Publication of translation No. 2008-506139, Japanese Laid-Open Patent Publication No. 2000-242658 and Japanese Laid-Open Patent Publication No. 2002-203168). Japanese Laid-Open Patent Publication No. 2002-108741 discloses a technology that an ID (Identification) code is added to digitized distribution information and distributed onto a broadcasting or communication network as distribution information with the ID code, so that only an individual user who has an information device equipped with a function for identifying an ID code and has the ID code matched is able to view the distribution information, and an answer replied from the individual user is stored in a database with the ID code as a set.

National Publication of translation No. 2008-506139 discloses a technology that user authentication and service approving are managed to access a plurality of networks present in a plurality of domains only with single identification information.

Japanese Laid-Open Patent Publication No. 2000-242658 discloses a technology that under a distributed environment where a client requesting a resource service and a server providing the resource service are connected through a network, by using a URL (Uniform Resource Locator) described in a format including procedure for converting a variable number of the URL to individual information of a client user, even a resource provider who does not manage individual information provides the resource customized for a user to the user using individual information.

Japanese Laid-Open Patent Publication No. 2002-203168 discloses a technology that usage history information indicating a time-series operational state of electric appliances recorded in a terminal apparatus capable of remote controlling is received in a server and a usage state of each electric appliance is analyzed based on the usage history information, and recommended information based on the analyzed usage state is provided to the terminal apparatus.

In addition, a technology that an operation panel of a multi-functional peripheral or the like is customized according to a user is also proposed (for example, see Japanese Laid-Open Patent Publication No. 2002-366248 and Japanese Laid-Open Patent Publication No. 2004-282673). Japanese Laid-Open Patent Publication No. 2002-366248 discloses a technology that in a programmed operation display apparatus which is connected to an external apparatus to be capable of performing display corresponding to a change in a state of the external apparatus, an individual who operates the operation display apparatus is identified to allow the display and operation of contents corresponding to the identified individual.

Japanese Laid-Open Patent Publication No. 2004-282673 discloses a technology that such a user customization is carried out in a management system in which OA equipment and a managing apparatus are connected through a network. In the management system described in Japanese Laid-Open Patent Publication No. 2004-282673, the OA equipment reads out identification information from an IC card and transmits it to the managing apparatus, and the managing apparatus transmits panel information stored being associated with the identification information to the OA equipment, so that the OA equipment displays a panel image different from a panel image set to itself in accordance with the panel information.

With the technology described in Japanese Laid-Open Patent Publication No. 2004-282673, it is possible to provide, based on user identification information registered in advance by a user, a user interface matched with the user to a multi-functional peripheral using a function of a cloud, without depending on an environment of places of the store of the CVS. That is, this technology enables to provide a user-customized user interface from a cloud server to the multi-functional peripheral, and also to provide a user interface capable of executing a function desired by the user, including a print function, a facsimile transmission function, an internet facsimile transmission function or the like, with one click, based on the usage history till now, for example.

First, however, using the multi-functional peripheral in the same model at all stores at all times is not realistic in view of a term required to introduce a system, a time of replacing devices, a production period of a manufacturer and the like, even in the stores of the CVS of the same chain. Second, a user does not always use a store where the multi-functional peripheral in the same model is installed. Third, there is a case where even multi-functional peripherals by the same manufacturer has different display capability of an operation panel and contents capable of being displayed on the operation panel even though the models are the same.

In view of such circumstances, in order to make it possible to always use a user interface desired by a user using the technology described in Japanese Laid-Open Patent Publication No. 2004-282673, it becomes necessary to perform a task of advance registration in an image output service in advance in the same manner each time the model is different when going to a store. Moreover, considering from a viewpoint of usability, it can be required to perform such a registration task even for the information registered in advance, thus such convenience that the image output service is provided immediately on site at every store of the CVS is not provided.

In addition, it is also desired to provide user customization information including print setting information such as image quality and a sheet size desired by the user, and the like for the multi-functional peripheral from the cloud server for the future.

SUMMARY OF THE INVENTION

An object of the present invention is to easily enable to operate with a user-customized user interface image in a multi-functional peripheral in every model in an image output system provided with a server and a plurality of multi-functional peripherals connected to the server through a network and capable of outputting an image.

A first technical means according to the present invention is an image output system comprising a server and a plurality of multi-functional peripherals connected to the server through a network and capable of outputting an image, wherein the multi-functional peripheral has a wireless communication portion which communicates with a mobile terminal apparatus wirelessly and an authentication processing portion which requests user authentication to the server based on user information including at least user identification information input from the mobile terminal apparatus or an operation portion provided in the multi-functional peripheral, the server has a user authentication portion which performs user authentication in response to a request from the multi-functional peripheral and an interface instruction portion which specifies a user interface image displayed on a display portion of the mobile terminal apparatus for operating the multi-functional peripheral depending on the user identification information, and instructs the multi-functional peripheral to display the user interface image on the mobile terminal apparatus when the user authentication is succeeded, and the multi-functional peripheral executes image output in accordance with a user operation received from the mobile terminal apparatus through the wireless communication portion in a state where the user interface image is displayed on the mobile terminal apparatus.

A second technical means is the image output system as defined in the first technical means, wherein the server has a history storage portion which acquires from the multi-functional peripheral a history of a user operation from the mobile terminal apparatus for storing, and the interface instruction portion changes the user interface image specified depending on the user identification information, in accordance with the history of the user operation.

A third technical means is the image output system as defined in the first technical means, wherein the server has a content registration portion which receives registration processing of a content subjected to image output, which is performed through the network and by specifying the user identification information from the mobile terminal apparatus or an information processing apparatus different from the mobile terminal apparatus, and stores the content in relation to the user identification information, and the multi-functional peripheral acquires the content from the server and executes image output for the acquired content.

A forth technical means is the image output system as defined in the third technical means, wherein the content registration portion registers image output setting about the content in relation to the content when executing the registration processing, and the multi-functional peripheral executes image output based on the image output setting acquired from the server when executing image output for the content.

A fifth technical means is the image output system as defined in the second technical means, wherein the server has a content registration portion which receives registration processing of a content subjected to image output, which is performed through the network and by specifying the user identification information from the mobile terminal apparatus or an information processing apparatus different from the mobile terminal apparatus, and stores the content in relation to the user identification information, and the multi-functional peripheral acquires the content from the server and executes image output for the acquired content.

A sixth technical means is the image output system as defined in the fifth technical means, wherein the content registration portion registers image output setting about the content in relation to the content when executing the registration processing, and the multi-functional peripheral executes image output based on the image output setting acquired from the server when executing image output for the content.

A seventh technical means is the image output system as defined in the first technical means, wherein when executing image output, the multi-functional peripheral executes image output for the content acquired from the mobile terminal apparatus.

An eighth technical means is the image output system as defined in the second technical means, wherein when executing image output, the multi-functional peripheral executes image output for the content acquired from the mobile terminal apparatus.

PREFERRED EMBODIMENTS OF THE INVENTION

Figure 1:
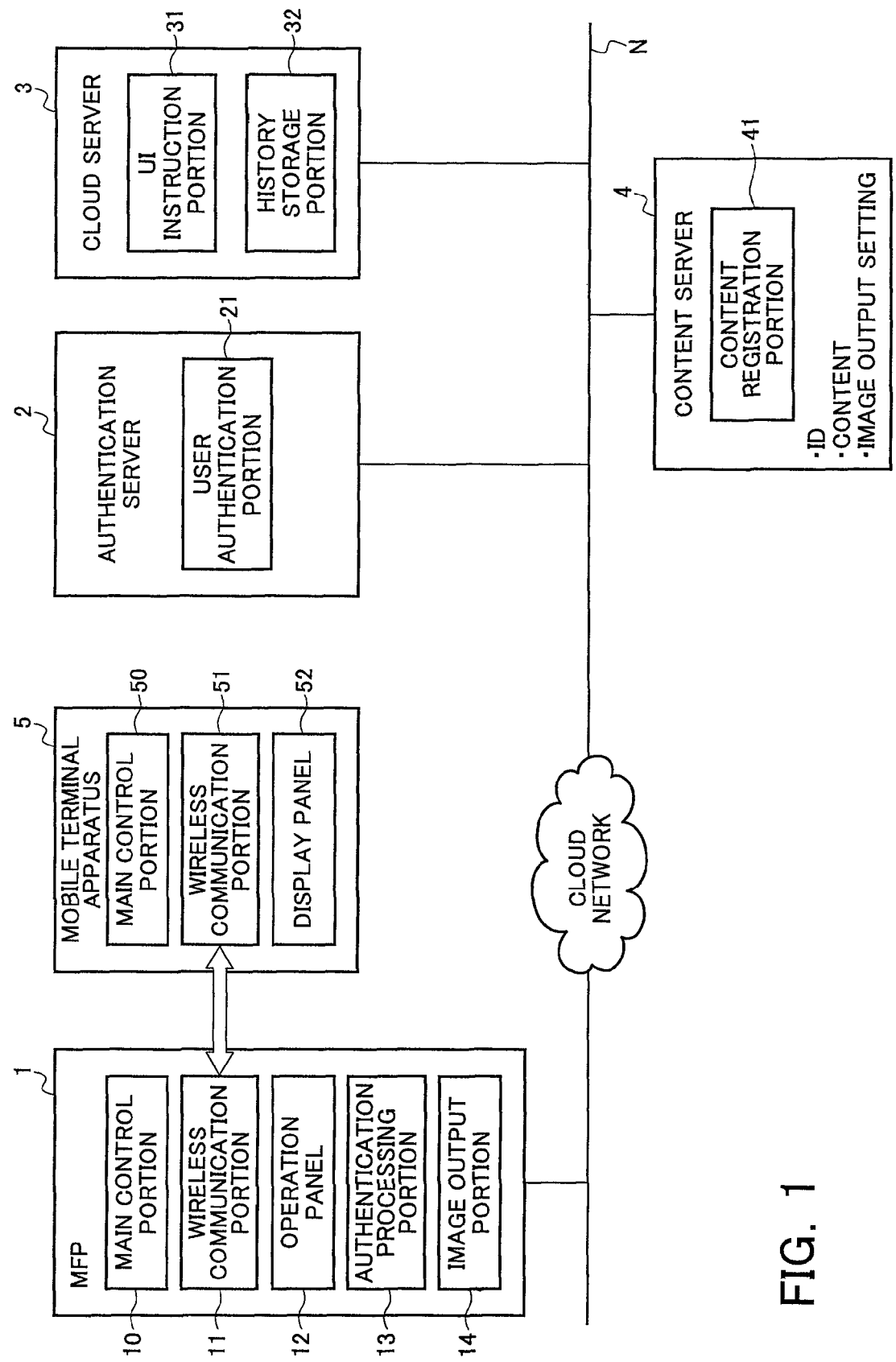
FIG. 1 is a view showing an exemplary configuration of an image output system according to the present invention.

FIG. 1 is a view showing an exemplary configuration of an image output system according to the present invention. The image output system (hereinafter, referred to as "this system") illustrated in FIG. 1 is a system provided with a server, and a plurality of multi-functional peripherals (hereinafter, referred to as "MFPs") connected to the server through a network N of a cloud.

As an example of such a server, description will be given below taking an example in which an authentication server 2, a cloud server 3 and a content server 4 are distributed and arranged on the network N of the cloud but may not be distributed. In addition, the MFP 1 is installed in each store of the CVS and is installed at some level of rate at least in the store of the same franchise to provide convenience. However, description will be given assuming that the MFP 1 is installed in a store of the CVS, but this system is able to be installed in various places such as public offices and schools.

This system has improved usability including use simplicity in image outputting by causing the MFP 1 to be cooperated with the system of the cloud. More specifically, when providing an image processing service (which may include a service for providing a content subjected to image processing) for performing image output for a content subjected to image processing in the MFP 1 using the MFP 1 installed in the store of the CVS, this system uses the cloud network for providing. In addition, this system is for eliminating burdensome by immediately cooperating with user customization information according to the operation which has been set once by a using user (operation panel customization information) and the like, even at any store the MFP 1 is tried to be used by cooperating with the system of the cloud.

Here, printing of a target content (which may also include printing of FAX reception data), FAX transmission through a network (internet FAX transmission), copying in a transportable recording medium such as a USB (Universal Serial Bus) memory attached to the mobile terminal apparatus 5 or the MFP 1, and the like correspond to the image output. Copying of not only a content purchased with a content purchasing function but also a content registered by a user himself/herself, which will be described below correspond to the copying, since there is a case where data is required suddenly. This system is also called a network print system when printing is included as the image output.

The MFP 1 has an operation panel 12 comprised of a display portion and an operation portion and an image output portion 14, in addition to a main control portion 10 for controlling the whole. Moreover, the MFP 1 used in this system is also provided with, as a main characteristic, a wireless communication portion 11 and an authentication processing portion 13 which will be described below.

Although description will be given below assuming that the operation panel 12 has a touch panel and is also used as a part of the operation portion, the operation may be performed based on a UI image displayed only with an operation button provided separately. For example, a printing portion, a network adapter and the like correspond to the image output portion 14. The main control portion 10 may be configured by hardware and a program (firmware). Examples of the hardware include a micro computer, a universal integrated circuit/chip set such as a programmable IC chip, and the like. A program for causing processing on the MFP 1 side according to the present invention including processing of the authentication processing portion 13 to be executed while controlling each of the portions 11, 12 and 14 and other not-shown portion by the hardware corresponds to the program (firmware). Moreover, the main control portion 10 may be configured only by the hardware, and in such a case, a dedicated micro computer, a dedicated integrated circuit/chip set or the like may be mounted for executing controlling of each of the portions 11 to 14 and other not-shown portion in the MFP 1 according to the present invention.

In addition, in the present invention, it is configured so as to be capable of operating the MFP 1 by the mobile terminal apparatus 5. Examples of the mobile terminal apparatus 5 include a mobile phone (which also includes one called smart phone), a mobile information terminal, a mobile PC and the like. The mobile terminal apparatus 5 has a display panel 52 illustrated by a display panel 52, an operation portion for receiving a user operation, and a wireless communication portion 51 which will be described below, in addition to a main control portion 50 for controlling the whole.

Although description will be given below assuming that the display panel 52 is a touch panel and is also used as a part of the operation portion, an operation button may be provided separately to perform the operation based on a UI image displayed on the display panel 52 with the operation button. The main control portion 50 may be also configured by hardware and a program, similarly to the main control portion 10. A program for causing processing on the mobile terminal apparatus 5 side according to the present invention to be executed while controlling each of the portions 51 and 52 and other not-shown portion by the hardware corresponds to the program (firmware or software). In addition, the main control portion 50 may be also configured only by the hardware, similarly to the main control portion 10, and in such a case, a dedicated micro computer, a dedicated integrated circuit/chip set or the like may be mounted for executing controlling of each of the portions 51 and 52 and other not-shown portion in the mobile terminal apparatus 5 according to the present invention.

Moreover, each of the authentication server 2, the cloud server 3 and the content server 4 has a main control portion. The main control portion may be configured by hardware and a program, similarly to the main control portion 10. A program for causing processing on each server side according to the present invention to be executed while controlling each portion in the server, which will be described below, and other not-shown portion by the hardware corresponds to the program (firmware). In addition, the main control portion may be also configured only by the hardware, similarly to the main control portion 10, and in such a case, a dedicated micro computer, a dedicated integrated circuit/chip set or the like may be mounted for executing controlling of each portion in each server according to the present invention, which will be described below, and other not-shown portion. However, a universal computer such as a PC is also applicable as a computer for the server.

Figure 2:
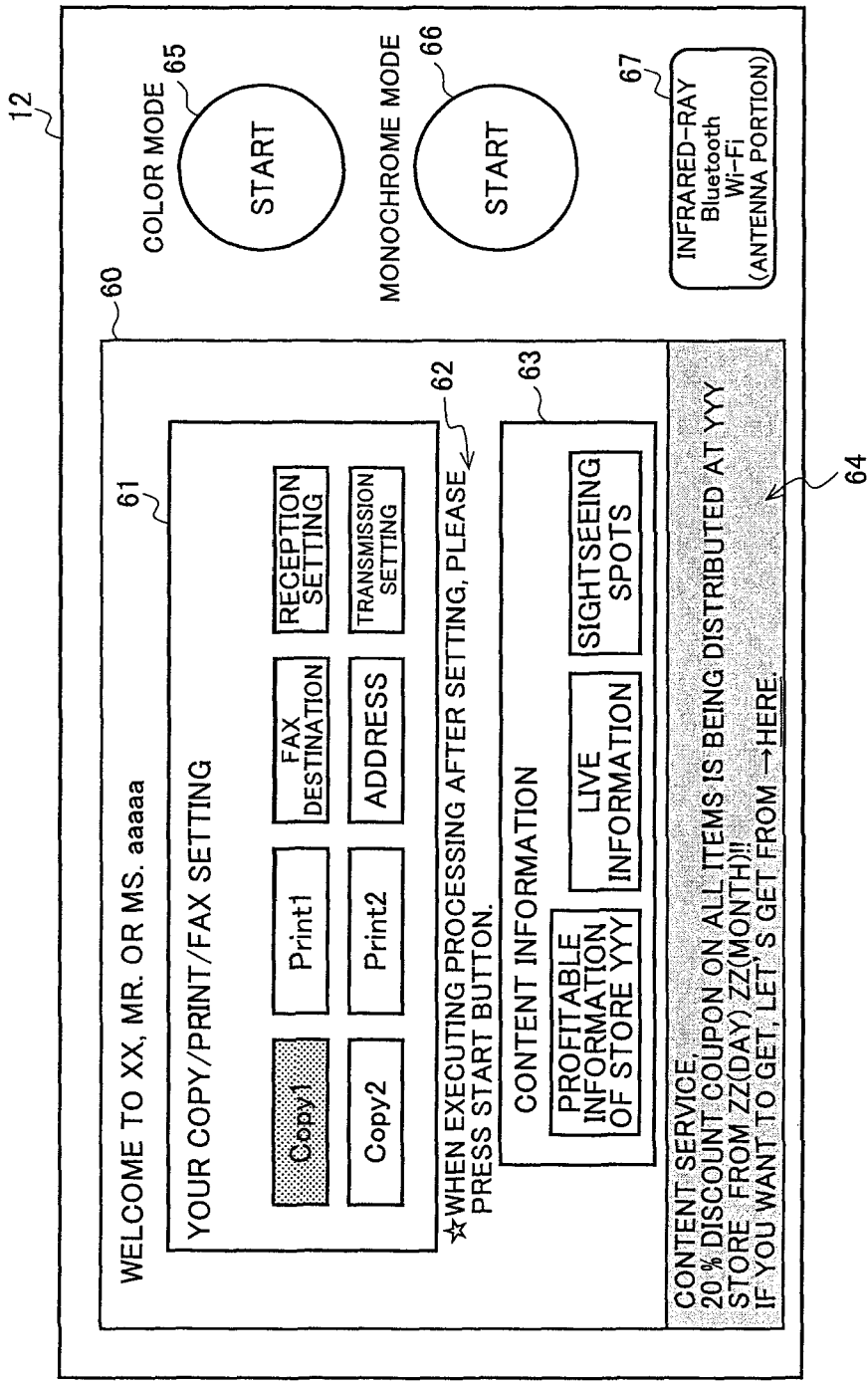
FIG. 2 is a view showing an example of an operation panel of a multi-functional peripheral in the image output system of FIG. 1.
Figure 3:
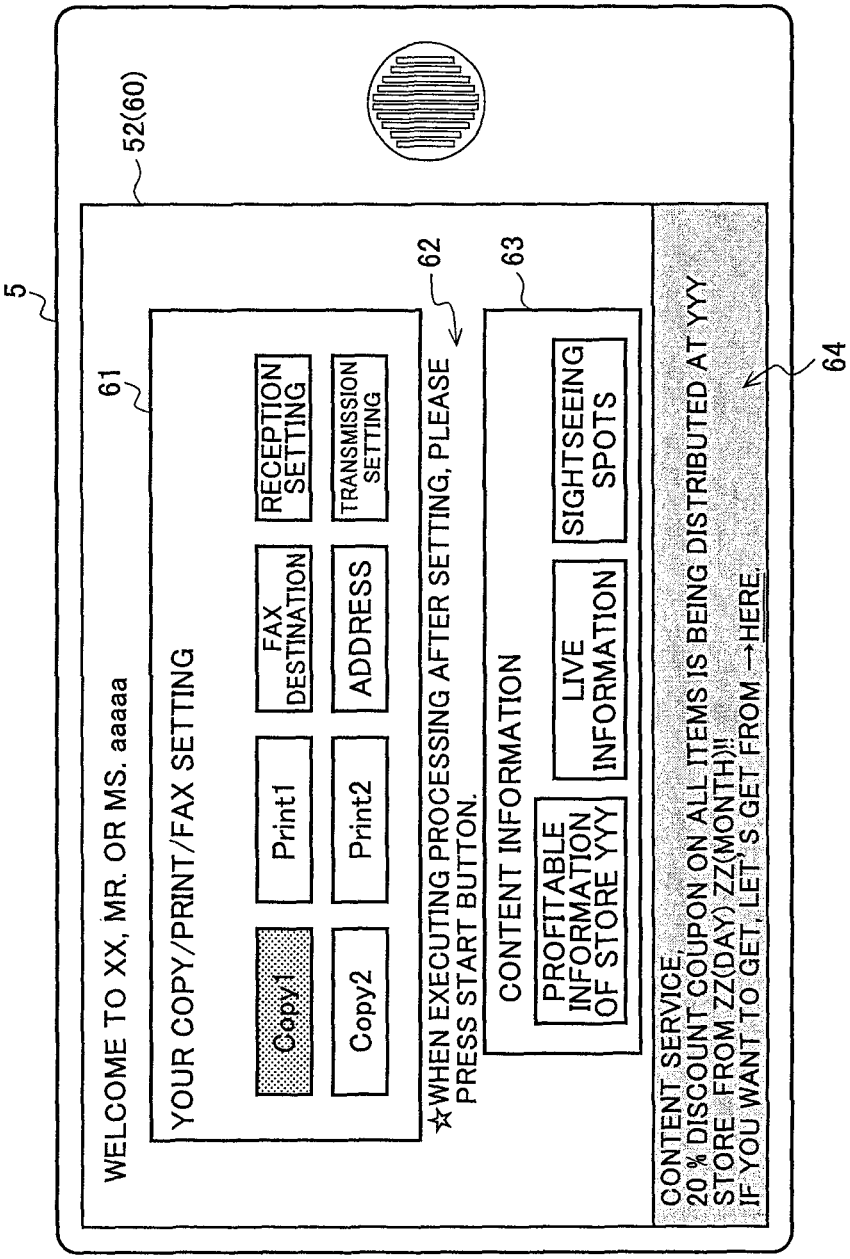
FIG. 3 is a view showing an example of a display panel of a mobile terminal apparatus in the image output system of FIG. 1.
Figure 4:
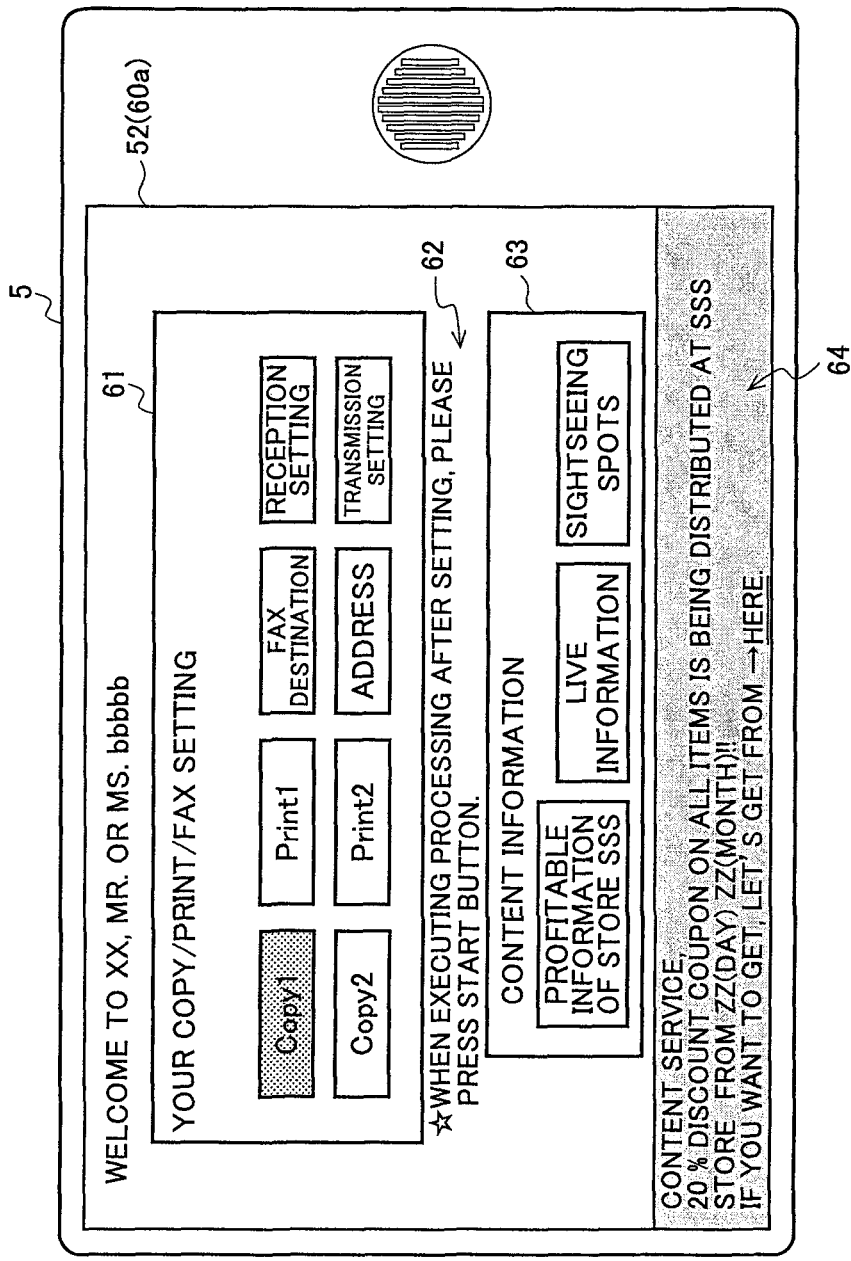
FIG. 4 is a view showing another example of the display panel of the mobile terminal apparatus in the image output system of FIG. 1, which is a view showing an example when a user different from that of the example in FIG. 3 is in using.

This system schematically has such a configuration. Description will be given below for a configuration and a function of each apparatus in this system, with reference to FIGS. 2 to 4 in combination. FIG. 2 is a view showing an example of an operation panel of an MFP in the image output system of FIG. 1, and FIG. 3 is a view showing an example of a display panel of a mobile terminal apparatus in the image output system of FIG. 1. In addition, FIG. 4 is a view showing another example of the display panel of the mobile terminal apparatus in the image output system of FIG. 1, which is a view showing an example when a user different from that of the example in FIG. 3 uses.

First, the wireless communication portion 11 of the MFP 1 is an interface communicating with the mobile terminal apparatus 5. The communication party is the wireless communication portion 51 provided on the mobile terminal apparatus 5 side and the wireless communication portion 51 is also an interface for carrying out communication wirelessly.

The wireless communication portion 11 and the wireless communication portion 51 may be capable of communicating with each other indoors or on a floor where at least the MFP 1 is installed, but may have a communication system in which communication is allowed only when closing to a position proximate to the MFP 1. For example, a wireless LAN such as Wi-Fi (registered trademark), infrared-ray communication, Near Field Communication (NFC) such as Bluetooth (registered trademark) and the like may be used. Note that, although a wired I/F and a cable may be used in place of the wireless communication portion 11 and the wireless communication portion 51, wireless communication saves more time and effort for cable connection and is therefore realistic.

The authentication processing portion 13 of the MFP 1 requests user authentication to the server (the authentication server 2 in this example) based on user information including at least user identification information (hereinafter, referred to as the "user ID") which is input from the mobile terminal apparatus 5 or the operation portion (the operation panel 12 in FIG. 1) provided in the MFP 1. Note that, for the communication with the cloud server 3 and the content server 4 including the authentication server 2, a not-shown network adapter may be provided in each apparatus.

Description will be given for the processing of the authentication processing portion 13 more specifically. The authentication processing portion 13, when receiving a connection request by wireless communication from the mobile terminal apparatus 5, requests user information such as a user ID to the mobile terminal apparatus 5 and requests user authentication to the authentication server 2 based on the user information such as the user ID input from the display panel 52 of the mobile terminal apparatus 5. Alternatively, the authentication processing portion 13, when receiving an operation of a connection request from the operation panel 12, displays a UI image requesting user information such as a user ID on the operation panel 12 and requests user authentication to the authentication server 2 based on user information such as a user ID input from the operation panel 12. The authentication processing portion 13 may be allowed to perform only one of processing or both processing. In either case, an authentication result as a result of the request may be returned to the requested side and, not only being returned, preferably displayed so that a user knows the authentication result.

The authentication server 2 has a user authentication portion 21 which performs user authentication in response to the request from the MFP 1. The user authentication portion 21 stores a user ID and a password being associated with each other for user authentication. A user ID and a password are examples of the above-described user information, but an address, a phone number and the like may be used in addition as the above-described user information. Note that, when the system is simple and a target of image output in this system is only the content provided by this system, a password may not be used.

In addition, the server (the cloud server 3 in this example) in this system has an interface instruction portion illustrated by a UI instruction portion 31 and preferably has a history storage portion 32 which will be described below. When the user authentication by the user authentication portion 21 succeeds, the UI instruction portion 31 specifies a UI image which is displayed on the display portion (hereinafter, illustrated by the display panel 52) in the mobile terminal apparatus 5 for operating the MFP 1 depending on a user ID, and instructs the MFP 1 to display the UI image on the mobile terminal apparatus 5.

The instruction (a) may be provided by transmitting the UI image to the MFP 1, (b) may be given by instructing which UI image stored in advance in the MFP 1 to be displayed by what procedure, or (c) may be given by instructing which UI image stored in advance in the mobile terminal apparatus 5 to be displayed by what procedure via the MFP 1. The procedure may need a series of UI images and data as to what UI image is shifted by a user operation.

Here, in the case of the above-described (b) an item such as an icon serving as an element may be saved in the MFP 1 so that such an item is stored so as to be readable by the firmware. In the case of the above-described (c), an item such as an icon serving as an element may be saved in the mobile terminal apparatus 5 so that such an item is stored so as to be readable by the firmware or the software. In any case of the above-described (a) to (c), if a user ID and a UI image corresponding to a user thereof (or information for specifying the UI image) are stored being associated with each other, the specification depending on the user ID is allowed in the UI instruction portion 31.

In accordance with the instruction by the UI instruction portion 31 as described above, the main control portion 10 of the MFP 1 passes the instruction to the mobile terminal apparatus 5 by wireless communication. A display on the mobile terminal apparatus 5 side in accordance with the instruction and an example of the display are one of main characteristics of the present invention, and details of which will be described below.

Moreover, at this time, if the UI image in accordance with the instruction is also able to be displayed on the operation panel 12 because of the capability and the like in the operation panel 12 of the MFP 1, the UI image is preferably displayed on a display portion of the operation panel 12 as illustrated by a UI image 60 of FIG. 2. However, such a display may not be performed, and in such a case, a UI image of a basic screen or a UI image of a predetermined screen of the MFP 1 may be displayed on the display portion of the operation panel 12.

Note that, the operation panel 12 in the example of FIG. 2 is also provided with a start button 65 for executing image output in a color mode and a start button 66 for executing image output in a monochrome mode. In addition, the operation panel 12 is also provided with an antenna portion of an infrared-ray transmission/reception portion and a Bluetooth (registered trademark) communication portion, or an antenna portion 67 of Wi-Fi (trademark), which corresponds to the wireless communication portion 11.

The UI image 60 is an example of a UI image when a user aaaaa uses a service (with a service name of XX) for performing image output, and has an operation area 61 customized for the user aaaaa. The UI instruction portion 31 is configured so as to be able to set the order of functions or to select an UI image itself from the mobile terminal apparatus 5 or other information processing apparatus (such as a PC). In addition, the operation area 61 is in such a state that functions are in the order set to the UI instruction portion 31 in advance by the user aaaaa or determined based on the operation history as described below, as well as one function similarly set in advance or determined based on the operation history is being selected.

Further, image output setting similarly set in advance by the user aaaaa or determined based on an operation history corresponds to each function, and one function (for example, "Copy 1") is selected to shift to a not-shown setting screen UI so that image output setting of the function is also able to be changed on site. In addition, when a start button 65 or 66 is selected in a state where one function (illustrated by "Copy" 1) is selected in a gray-out manner, color or monochrome printing is performed with the function and image output setting (for example, setting of performing layout printing with 2 in 1 on an A4 sheet of paper). Although such image output is possible by the MFP 1 installed in every store of the CVS, the device which is non-color-compliant may correspond only to monochrome printing.

Moreover, since the start buttons 65 and 66 are also provided in the operation panel 12, an explanatory text 62 suggesting a method for instructing the final image output is preferably displayed on the UI image 60 of FIG. 2. In addition, content information 63 about a content provided for image output by the content server 4 and discount information 64 for the content may be displayed. The user selects a selection area included in the content information 63, in this example, a desirable selection area from among profitable information, live information and sightseeing spots, to shift to a lower layer of the UI image, so that it is possible to select a content subjected to image output finally.

The UI image like the UI image 60 is preferably able to provide the same as much as possible by the MFP 1 in every place, in the case of the same user, the same advance setting and the like, but it often happens that some MFP is not able to provide the same due to a difference of the model or is difficult to rewrite the firmware into such processing. As described above, in a case where the MFP 1 does not have a function of performing such a display and the like, an image for a default screen (for example, a UI image of an initial screen) itself may be used, but, for example, only the explanatory text 62 of the start button may be eliminated from the display in FIG. 2.

In order to make up for such a difference of the model of the MFP 1, this system gives an instruction to the mobile terminal apparatus as described above, and as to the display, displays a UI image depending on the user on the display panel 52 of the mobile terminal apparatus 5 for which more universal device is distributed.

In the mobile terminal apparatus 5, the main control portion 50 causes the display panel 52 to display the UI image in accordance with the instruction described above from the MFP 1. In addition, a resolution of the UI image may be specified, but in such a case, the resolution may be able to be displayed on a universal mobile terminal apparatus with a display portion. Of course, the resolution may not be particularly specified, and it is also possible to adjust on the mobile terminal apparatus 5 side by displaying being enlarged or reduced to fill the display panel 52.

In this manner, the UI image 60 as illustrated in FIG. 3 is displayed on the display panel 52 of the mobile terminal apparatus 5. The UI image 60 of FIG. 3 is basically the same as the UI image 60 of FIG. 2. However, it is a primary purpose to display the UI image 60 of FIG. 3 on the display panel 52, and as far as such a display is possible, the user is able to operate the MFP 1 from the mobile terminal apparatus 5, so that it is not always necessary to display the same UI image on the operation panel 12 of FIG. 2 as described above.

In addition, in a state where the UI image as illustrated in FIG. 3 (that is, the UI image depending on the user ID) on the mobile terminal apparatus 5 based on the instruction by the UI instruction portion 31, the MFP 1 executes image output for a content acquired from the server (the content server 4 in this example) in accordance with the operation by the user received from the mobile terminal apparatus 5 through the wireless communication portion 11.

This makes it possible to execute printing of a target content (which may include printing of FAX reception data), internet FAX transmission of a target content, copying to a transportable recording medium attached to the mobile terminal apparatus 5 and the MFP 1, and the like. Moreover, from the UI image 60, in addition to setting of a destination of internet FAX and displaying of an address book, reception setting of internet FAX (which corresponds to printing or copying to a transportable recording medium of a received facsimile image as a content) and transmission setting of internet FAX are allowed, the setting contents thereof are also determined by the advance setting of the user and further able to be changed also from the UI image 60.

Description will be given for the UI image 60 of FIG. 3. For the UI image 60 of FIG. 3, the start buttons 65 and 66 are provided in the operation panel 12 and by selecting any one of them, image output is executed, so that the explanatory text 62 suggesting a method for instructing the final image output may be displayed on the UI image 60 of FIG. 3. Thereby, the start button 65 or 66 in the operation panel 12 is finally pressed to execute the processing. Alternatively, icons like the start buttons 65 and 66 may be included in the UI image 60. Thereby, image output is executed by pressing the start button 65 or 66 in the operation panel 12 or selecting the icon of the start button 65 or 66 displayed on the display panel 52 additionally on the UI image 60 of FIG. 3, that is, by performing the final start operation in either the MFP 1 or the mobile terminal apparatus 5. With either method, it is possible to execute the image output without confusion of the user.

Moreover, the content information 63 and the discount information 64 similar to those in the UI image 60 of FIG. 2 may be displayed on the UI image 60 of FIG. 3. The user is able to select a content subjected to image output finally by shifting to a lower layer of the UI image 60.

A UI image 60a illustrated in FIG. 4 is one in which functions set in advance by a user bbbbb or determined based on an operation history and image output setting are displayed and is different from the UI image 60 of FIG. 3. In this example, an example is given in which the order of "Copy 1", "Copy 2", "Print 1" and "Print 2" in the operation area 61 is simply changed to "Print 1", "Print 2", "Copy 1" and "Copy 2", but without limitation to such a simple difference, arrangement of a selection area of each function may be determined depending on a user ID and further whether or not to display the content information 63 and the discount information 64 may be determined depending on a user ID.

In addition, the content information 63 of the UI image 60*a* of FIG. 4 has a different store name from the content information 63 of the UI image 60 of FIG. 3, such a difference is able to be made simply by allowing a UI part for providing a content to be set in advance for each user. For example, a content purchasing function may be allowed to be set in advance so as to utilize the function. Moreover, as described below, even by displaying the preferable store corresponding to browsing of Web stores by the user or the usage history, it is possible to make a change depending on the history.

In addition, as to a timing when the MFP 1 determines a content subjected to image output, with respect to a plurality of contents when contents are registered by a plurality of users and a content provided as a service from the store side by the content server 4, a target of the image output may be determined in accordance with the user operation by displaying a UI image for selecting a content subjected to the image output. When the user registers a content and when there is one content registered, the content may be determined automatically as the target of the image output or may be determined at a stage where a file name and the like are caused to be confirmed in advance once to receive the operation for the confirmation.

In addition, a timing when the MFP 1 acquires a content subjected to the image output may be when the start button 65 or 66 is pressed, or if a similar button is also displayed on the display panel 52, when the button is touched. Further, a content subjected to the image output is a content stored in the content server 4, the content may be transmitted directly from the content server 4 to the MFP 1, but may be transmitted from the content server 4 to the mobile terminal apparatus 5 so that the mobile terminal apparatus 5 transmits the content to the MFP 1.

In this manner, since it is configured such that the user operates the MFP 1 by the mobile terminal apparatus 5 for image output while viewing a UI image, even an MFP which is not provided with an operation panel with high functionality is able to be operated by the mobile terminal apparatus 5 as if there is the operation panel 12 with high functionality. It is also possible to provide such a UI that a function desired by the user is able to be executed by one click of the start button 65, 66 or the like among image output functions such as a print function and an internet FAX transmission function, for example, based on advance setting by the user.

Next, description will be given for the history storage portion 32 provided in the cloud server 3. The history storage portion 32 acquires from the MFP 1 a history of a user operation (operation history) from the mobile terminal apparatus 5 for each user operation or after a series of user operations are finished to store the history in relation to a user ID. Then, the UI instruction portion 31 changes a UI image to be specified depending on the user ID in accordance with the history of the user operation which is stored, that is, by learning automatically. The history referenced in the change may employ the frequently-used function or the frequently-used image output setting by taking statistics or may employ the latest function and image output setting.

In this manner, by providing the history storage portion 32, it becomes possible to change the UI image specified by the UI instruction portion 31 depending on the user operation and the user is able to customize the UI image based on the usage history and summary that the user has operated in the MFP 1 until now. For example, it also becomes possible to provide such a UI that a function desired by the user is able to be executed by one click of the start button 65, 66 or the like among image output functions such as a print function and an internet FAX transmission function, for example, based on the usage history of the user until now. In addition, the UI instruction portion 31 specifies a UI image by referring not only to the user operation in the MFP 1 but also to a browsing history and a purchasing history at a sales site on the Web provided by a company managing the store where the MFP is installed, for example, so that it is possible to present the content information 63, for example, as shown in FIGS. 2 to 4 based on the browsing history and the purchasing history.

Moreover, the server (the content server 4 in this example) which provides a content is preferably provided in this system, and the content server 4 will be described. The content server 4 has a content registration portion 41. The content registration portion 41 receives content registration processing performed through the network N as well as by specifying user information such as a user ID from the mobile terminal apparatus 5 or an information processing apparatus (such as a PC) different from the mobile terminal apparatus and stores the content in relation to the user ID. Thereby, the MFP 1 is able to acquire the content from the content server 4 and execute image output for the acquired content.

In the registration processing, the content registration portion 41 preferably registers image output setting regarding the content in relation to the content, that is, allows the user to register also image output setting in registering the content. Thereby, sheet size information and color tone information (such as a density and a resolution) finely adjusted by the user are also managed in a state of being allowed to access from the cloud server 3 so that the same information is able to be acquired for printing out even though the user accesses from any store.

Here, an example is taken that the image output setting is managed by the content server 4, but the image output setting may be managed by the cloud server 3, and in such a case, by associating not only with a user ID but information indicating a content (such as a content ID), it is possible to display a UI image in application on the image output of the content registered on the content server 4. Moreover, although an example is taken that the image output setting is also registered for the content registered in the content server 4 by the user, the registration target is not only the content acquired or produced in other than the cloud system by the user.

Other content also serves as a registration target and is also able to be a registration target of the image output setting. Although the image output setting described above is basically the same as the image output setting described with reference to FIGS. 2 to 4, the image output setting described to be registered by the content registration portion 41 is different in terms of being the image output setting for the uniquely decided content registered by the user. The image output setting described with reference to FIGS. 2 to 4 is the image output setting which is generally usable, and may be set by the user in advance to the UI instruction portion 31 to be read out or may be determined by the UI instruction portion 31 based on the history with reference to the history storage portion 32. The advance setting is also able to be realized by configuring such that "an arbitrary content" is virtually registered in the content registration portion 41 and the image output setting is performed for the content. Based on the similar point of view, it is also possible to configure such that the content registration is performed by specifying a content provided from the store side and the image output setting is performed for the content.

As described above, according to this system, an MFP in every model becomes possible to provide a user-customized UI Image from the cloud server 3 to the MFP 1 so as to easily enable the operation by the user-customized UI image. Further, by registering image output setting in advance in each function, it is possible to perform the image output consistent with the setting. In addition, a manufacturer is able to easily develop the mode of such an MFP 1 and to add the function just by version upgrade of the firmware of the main control portion 10 with common specification of simply providing a wireless communication portion. In particular, it is possible to provide this service without concern even for a lineup that a size of an operation panel is different depending on the model.

Moreover, as illustrated in FIG. 2, this system is also able to be configured such that, by preparing models of the MFP 1 (at least, display performance), based on a user ID or the like registered in advance by the user, a UI image consistent with the user is provided to the operation panel 12 of the MFP 1 using the function of the cloud without depending on an environment such as places of the store of the CVS. That is, this system enables to provide a user-customized UI image from the cloud server 3 to the MFP 1, and is also possible to provide a UI capable of executing a function desired by the user by one click among image output functions such as a print function and an internet FAX transmission function, for example, based on the usage history until now by the user.

Figure 5:
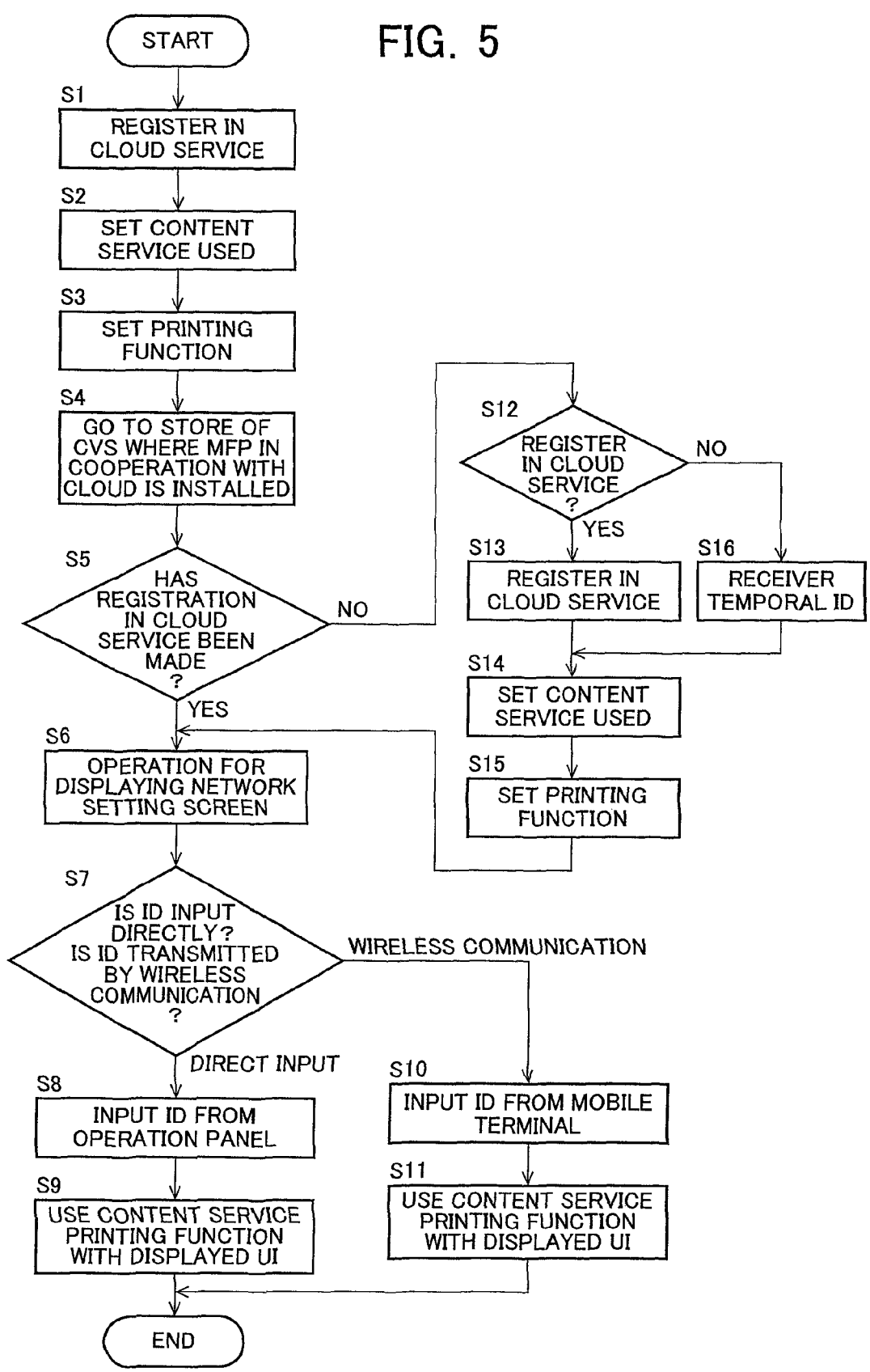
FIG. 5 is a flowchart for explaining an example of a flow when a user performs image output using the image output system of FIG. 1.
Figure 6:
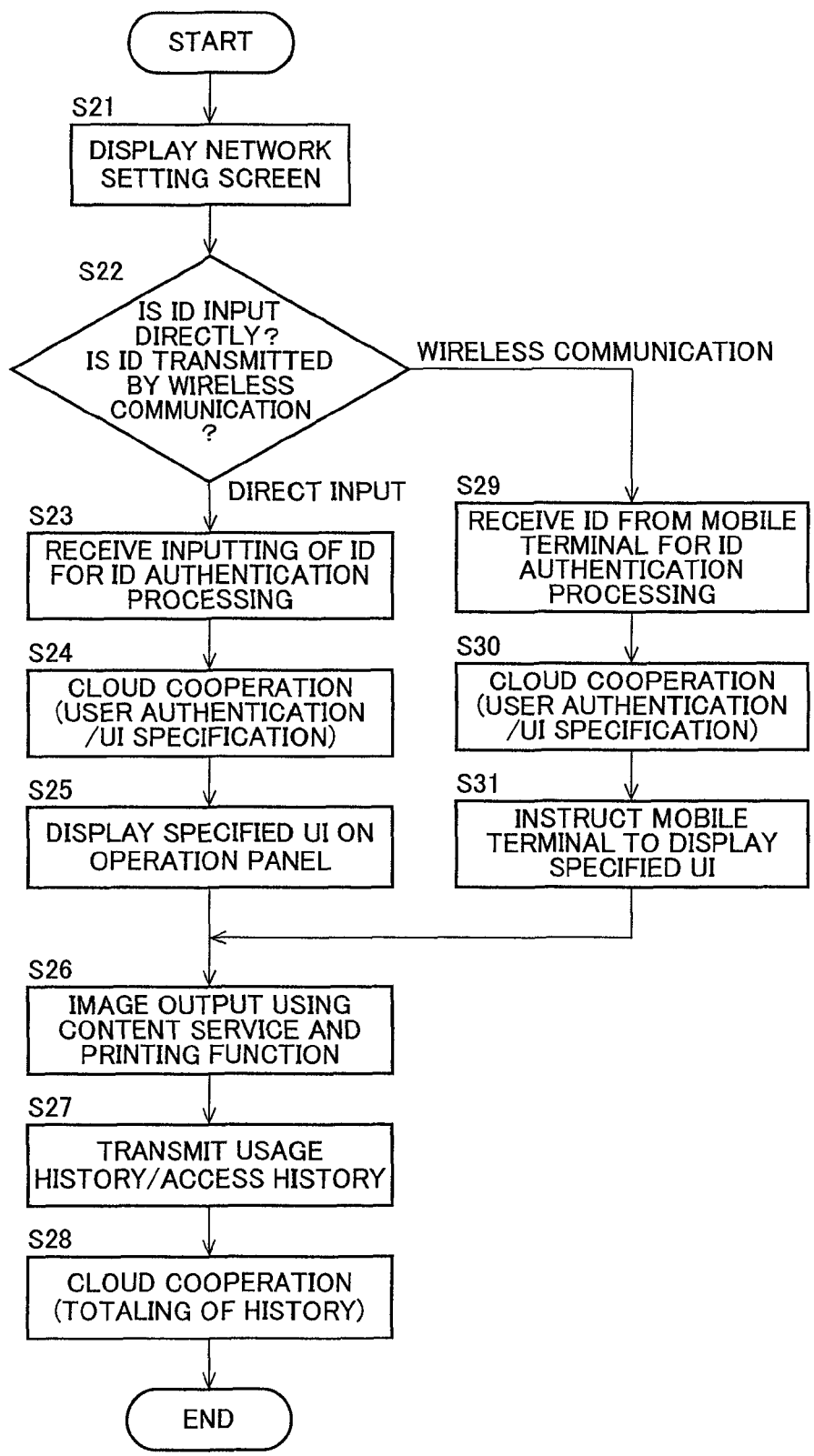
FIG. 6 is a flowchart for explaining an example of an operation of a multi-functional peripheral in the image output system of FIG. 1.

Next, description will be given for an example of a flow of image output of this system, with reference to FIG. 5 and FIG. 6. FIG. 5 is a flowchart for explaining an example of a flow when a user performs image output using the image output system of FIG. 1, and FIG. 6 is a flowchart for explaining an example of an operation of an MFP in the image output system of FIG. 1.

First, a task flow of a user will be described based on FIG. 5. The user subscribes to a service provided in this system on a dedicated Web site (for example, a site provided on the cloud server 3) (step S1). At this time, for example, a user ID of 10-digit alphanumeric characters or the like is issued or is determined by the user so as to avoid overlapping. The user ID is described with reference to FIGS. 1 to 4 and the registration contents are stored in the user authentication portion 21 and the like.

In addition, the user sets a content service to be used at the time of membership registration or later (step S2). The setting here is to set, for example, a service which is likely to be used. When requiring a fee, the price may be differentiated depending on the number of services. Then, the user sets a function which is most likely to be used (a printing function, that is, a print function in this example) in advance at the same time with step S2 or later (step S3). At this time, a content to be printed is also registered.

The user goes to a store of the CVS where the MFP 1 in cooperation with the cloud is installed (step S4), and when registration in the cloud service has been already made (in the case of YES at step S5), operations of steps S7 to S11 are performed. On the other hand, when the registration has not been performed at step S1 and the like (in the case of NO at step S5), whether or not to register to the cloud service is judged (step S12), and in the case of performing the registration (in the case of YES at step S12), similar tasks to steps S1 to S3 are performed from the MFP 1 or the mobile terminal apparatus 5 which is owned (steps S13 to S15). In the case of NO at step S12, for using at least the service, for example, after acquiring a temporal ID from the cloud server 3 (step S16), the tasks of steps S14 and S15 are performed. After step S16, the flow goes to step S6.

At step S6, since the registration or the temporal registration has been already performed in the cloud service at this stage, an operation for displaying a network setting screen as a log-in screen is performed on the operation panel 12 of the MFP 1 to which the user goes or on the display panel 52 of the mobile terminal apparatus 5 (step S6). When it is judged that a user ID is directly input to the MFP 1 (in the case of "direct input" at step S7), the user ID is input from the operation panel 12 to perform user authentication (step S8). On the other hand, when it is judged that the user ID is input from the mobile terminal apparatus 5 (in the case of "wireless communication" at step S7), the user ID is input from the mobile terminal apparatus 5 near the operation panel 12 to perform user authentication via wireless communication (step S10). After the processing of steps S8 and S10, a UI image depending on the input user ID is displayed on the display panel 52 (and the operation panel 12) in either case, and is operated to execute printing of a content which has been registered (steps S9 and S11). Steps S9 and S11 are described separately, but are the same processing.

Next, description will be given focusing on processing in the MFP 1 as processing in this system.

First, the MFP 1 displays the network setting screen on the operation panel 12 corresponding to step S6 and also on the display panel 52 by wireless communication (step S21). The MFP 1 judges whether the user ID is input directly by the operation panel 12 or input by the display panel 52 of the mobile terminal apparatus 5 (step S22), and in the former case, processing of steps S23 to S25 is executed, and in the latter case, processing of steps S29 to S31 is executed.

At step S23, inputting of the user ID is received to request user authentication to the authentication server 2. Then, in accordance with the request, the cloud system carries out cloud cooperation, so that the authentication server 2 performs user authentication, and when it fails, notification of failure is made, and when it succeeds, a UI image depending on the user ID is specified by the cloud server 3 and the instruction to display therefor is performed to the MFP 1 (step S24). Next, the MFP 1 displays the UI image on the operation panel 12, if possible, and displays the UI image on the display panel 52 of the mobile terminal apparatus 5 (step S25).

As to the UI image displayed at step S25 and step S31 described below, based on the setting at steps S2 and S3 of FIG. 5, a function to be displayed on the UI image and a function to be displayed in a state of being already selected at a position where the selection is made most easily (the print function in this example) are determined. However, in the case of considering the history of the user operation, if the function selected by the user is different after the display of the UI image, the selected function may be displayed next time at a position where the selection is made most easily.

Subsequent to step S25, the MFP 1 performs image output in accordance with the user operation received from the operation panel 12 or the display panel 52 (step S26). In addition, the MFP 1 transmits a usage history of a function in the UI image and an access history (such as what type of content is accessed) in a content providing server to the cloud server 3 (step S27). Then, by cooperating with the cloud, the cloud server 3 performs totaling of the history (step S28).

In addition, at step S29, inputting of the user ID is received by wireless communication to request user authentication to the authentication server 2. Then, in accordance with the request, the cloud system carries out cloud cooperation, so that the authentication server 2 performs user authentication, and when it fails, notifying to be failed, and when it succeeds, a UI image depending on the user ID is specified by the cloud server 3 and the display and the instruction therefor is performed to the MFP 1 (step S30). Next, since the user has desired the operation from the operation panel 52 of the mobile terminal apparatus 5, the MFP 1 displays the UI image only on the display panel 52 without displaying the UI image on the operation panel 12 (step S31). Then, the flow goes to step S26.

With such processing, the user is able to use the cloud service by operating the user-customized UI image from the mobile terminal apparatus 5. Moreover, since it is also possible to cooperate with gathering of information of a function used by the user and an accessed service via the network in the cloud server, it is possible to total into data for fulfilling client satisfaction by gathering and totaling user needs immediately.

In this manner, this system has improved usability and is applicable to a service which is able to be started easily wherever the store of the CVS and the like and institutions are. Here, considering that this system is placed in the CVS mainly, it is possible to provide content information which is frequently used by the user based on the history of the user operation and similar content information, and also to provide a service which is usable in the store of the CVS and the like, including coupon information, information of an expiring date for points and the like. They are as illustrated by the content information 63 and the discount information 64 of FIGS. 2 to 4. In addition, the cloud server 3 is able to cooperate with the content server 4 of various contents provided by the store, thus making it possible to provide information desired by each user to the user corresponding to the totaled access frequency, resulting that it is also possible to produce new functionality by catching up user requests. Moreover, it is possible to total information in the day unit and in the user unit to some extent from the history of these user operations, which is able to be useful for maintenance by a service man and extraction of user needs of the user. In this manner, the above-described information provided as a service from the store side is also able to be useful for the needs analysis in each store of the CVS and the needs analysis in the whole CVS, which is able to be configured to be collectively managed by the cloud server 3 and the like.

In addition, the history of the user operation including the function used by the user and the like is usable as sales performance information, particularly when the content provided from the content server 4 by the store side is subjected to image output. Accordingly, when the user enjoys the service, acquisition information (such as age information judging the age of the user) is supplied from the store and the like to a POS (Point Of Sale) server as well as information of the history of the user operation described above in the cloud server 3 is automatically supplied to the POS server, so that it is possible to accumulate sales performance information in the POS server.

Moreover, although there is a case where a service man does maintenance of the MFP 1, it may be configured such that the user is able to transmit a service man call from the MFP 1 directly or via the mobile terminal apparatus 5 to the cloud system side. In addition, similarly to the user, it is configured such that a UI image customized for a service man is also able to be displayed, and at the time when the service man does maintenance, a maintenance state is transmitted to the cloud server 3 from the operation panel 12 or the similar UI image customized for the service man. It is also possible to configure such that, in response to the transmission, the cloud server 3 totals alert information such as serviceman calls generated so far, so that the response is given to the MFP 1 to display consumables necessary for the MFP 1, a portion which requires maintenance and the like immediately on the operation panel 12 or the display panel 52.

As described above, although description has been given assuming that the server according to the present invention (the content server 4 in the example of FIG. 1) stores a content subjected to image output, this system is not limited to such an example and may be one in which the content subjected to image output is stored in the mobile terminal apparatus 5.

That is, when performing image output, the MFP 1 executes the image output for the content acquired from the mobile terminal apparatus 5. Of course, in this case as well, a user operation is received by the mobile terminal apparatus 5 and the MFP 1 executes the image output of the content in accordance with the user operation in a state where a UI image is displayed on the display panel 52. The content may be acquired by requesting from the MFP 1 or by contraries, may be transmitted to the MFP 1 from the mobile terminal apparatus 5 side.

Other content subjected to image output may be one, for example, read from a transportable recording medium such as a USB memory attached to the MFP 1. Moreover, in these examples as well, it may be configured such that the image output of the content is also possible by the user operation from the operation panel 12 of the MFP 1.

As described above, although description has been given for the image output system according to the present invention, the present invention is also able to employ the form of an image output method for performing image output in the above-described system. The method and applications are as described for the image output system and the description of which will be omitted. In addition, the present invention can also employ the form of a program causing a computer in each apparatus in the image output method to execute. As the computer in each apparatus, various types of computers including a micro computer, a universal integrated circuit/chip set which is programmable, and the like are applicable. As described above, a universal computer is also applicable to the computer for the server. In addition, these programs are able to be distributed via the network such as the Internet, or via a broadcast wave, further via a transportable recording medium.

Moreover, according to the present invention, in an image output system provided with a server and a plurality of multi-functional peripherals connected to the server through a network and capable of outputting an image, a multi-functional peripheral in every model is easily allowed to operate with a user-customized user interface image.

The invention claimed is:

1. A multi-functional peripheral capable of outputting an image and being connected to a server via a network, comprising:
 a display portion,
 a communication portion configured to communicate with an external terminal apparatus,
 an authentication processing portion configured to request the server user authentication based on user information which includes at least a user identification information and is input from the external terminal apparatus or an operation portion provided in the multi-functional peripheral, and a control portion configured to display a user interface image which is transmitted from the server when succeeding in the user authentication on the display portion or to display a user interface image which is transmitted from the server when succeeding in the user authentication on a display portion of a side of the external terminal apparatus, wherein the user interface image is an image which is specified depending on the user identification information and for operating the multi-functional peripheral, and an image output is executed in accordance with a user operation which is received from the operation portion or a user operation which is received via the communication portion from the external terminal apparatus, in a state where the user interface image is displayed on the display portion or a state where the user interface image is displayed on the display portion of the side of the external terminal apparatus based on the user operation history the multi-functional peripheral changes the user.

2. The multi-functional peripheral according to claim 1, wherein the multi-functional peripheral executes the image output for the content acquired from the external terminal apparatus.

3. An image output method in a multi-functional peripheral capable of outputting an image and being connected to a server via an internet, and including a display portion, comprising:

an authentication processing step for requesting the server user authentication based on user information including at least user identification information input from the external terminal apparatus or from an operation portion provided in the multi-functional peripheral, and a control step for displaying a user interface image which is transmitted from the server on the display portion when succeeding in the user authentication or a user interface image which is transmitted from the server when succeeding in the user authentication, wherein the user interface image is an image which is specified depending on the user identification information and for operating the multi-functional peripheral, and an image output is executed in accordance with a user operation which is received from the operation portion or a user operation which is received from the external terminal apparatus, in a state where the user interface image is displayed on the display portion or a state where the user interface image is displayed on the display portion of the side of the external terminal apparatus.

4. The image output method according to claim 3, wherein the image output method executes the image output for the content acquired from the external terminal apparatus.

5. An external terminal apparatus comprising a communication portion which communicates with a multi-functional peripheral capable of outputting an image and being connected to a server via a network, a display portion, and an operation portion, wherein the external terminal apparatus is configured to request the server user authentication based on user information input from the operation portion and including at least user identification information, receive a user operation in a state where a user interface image transmitted from the server when succeeding in the user authentication, and transmit the user operation to the multi-functional peripheral via the communication portion so as to causes the multi-functional peripheral to execute an image output according to the user operation.

6. The external terminal apparatus according to claim 5, wherein contents for the image output are transmitted from the external terminal apparatus.

7. The multi-functional peripheral according to the claim 1, wherein the user interface image to be displayed on the display portion of the multi-functional peripheral and the user interface image to be displayed on the display portion of the side of the external terminal apparatus are different from each other.

8. The image output method according to the claim 3, wherein the user interface image to be displayed on the display portion of the multi-functional peripheral and the user interface image to be displayed on the display portion of the side of the external terminal apparatus are different from each other.

* * * * *